A. E. MOOK.
Bird-Cage.

No. 8,486. Reissued Nov. 12, 1878.

Witnesses:
M. J. Stark
Jno. Stark

Inventor:
Anson E. Mook
by Michael J. Stark
Atty

N. PETERS, PHOTO-LITHOGRAPHER, WASHINGTON, D. C.

UNITED STATES PATENT OFFICE.

ANSON E. MOOK, OF EAST PEMBROKE, NEW YORK.

IMPROVEMENT IN BIRD-CAGES.

Specification forming part of Letters Patent No. 189,251, dated April 3, 1877; Reissue No. 8,486, dated November 12, 1878; application filed October 28, 1878.

*To all whom it may concern:*

Be it known that I, ANSON E. MOOK, of the town of East Pembroke, in the county of Genesee and State of New York, have invented certain new and useful Improvements in Bird-Cages; and I do hereby declare that the following description of my said invention, taken in connection with the accompanying drawings, forms a full, clear, and exact specification, which will enable others skilled in the art to which it appertains to make and use the same.

My invention consists in the combination of the cage with a rotative wheel arranged so as to provide for a large opening around the supporting-rod, so that the bird may pass from the cage to the wheel from all directions, and without injury, while the latter is in motion.

My invention further consists in the production of a wheel for bird-cages the rim of which is supported on one side only, having the opposite side entirely (or nearly so) open for the passage of the bird.

My invention further consists in the combination, with the revolving wheel, of a series of perches, as hereinafter more fully set forth and described, and then pointed out in the claims.

Figure 1:
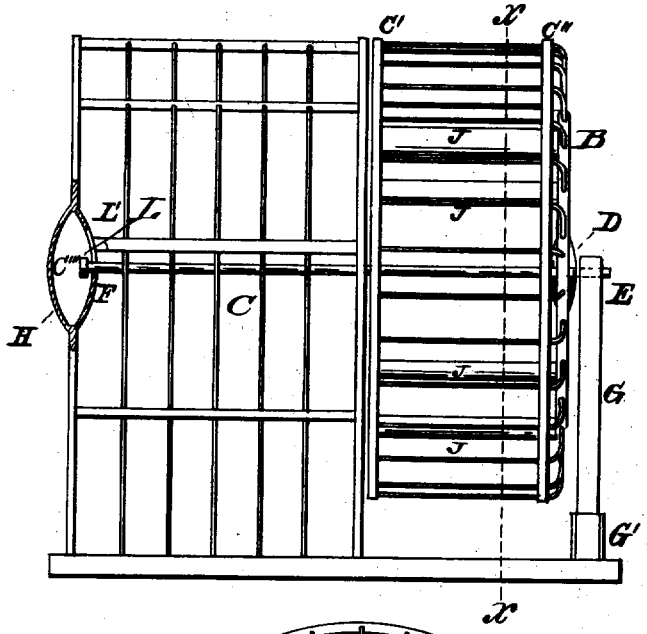
Figure 2:
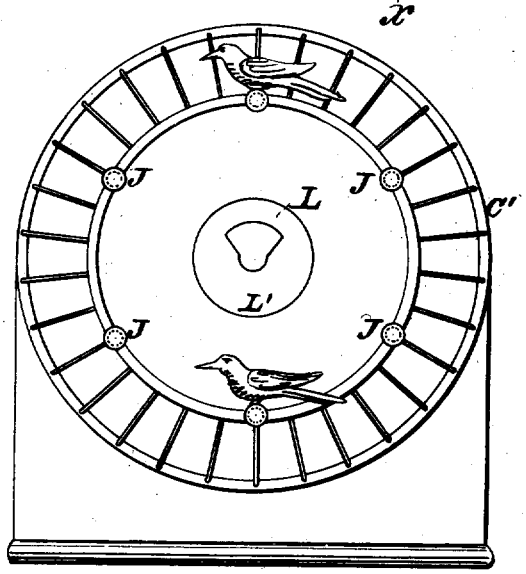
Figure 3:
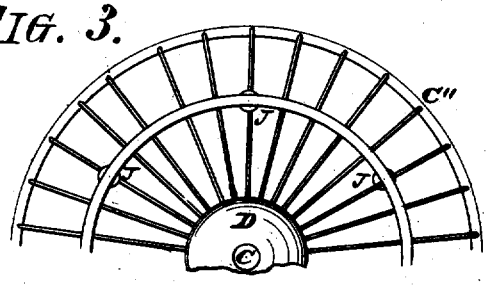

In the drawings heretofore mentioned, which serve to illustrate my invention more fully, Figure 1 is a side elevation; Fig. 2, a front view, showing a section through the wheel in line *x x* of Fig. 1; and Fig. 3 represents a front view of the wheel.

Like letters of reference indicate corresponding parts in all the figures.

A represents the body of the cage, which may be made in any of the well-known forms and of the usual materials. It differs from the usual cages in so far only that it has but three of its sides closed with filling-wires, while in its fourth side there is left a large circular opening, occupying nearly the entire space of said fourth side, for the reception of a wheel, B, secured to a spindle, C. This wheel is formed, practically, of wire passed through bands C′ C″, and bent so as to meet in the central disk, D, the radiating wires forming the support of the rim of said wheel. The opposite side of this wheel is left with a large annular opening, and the rim made without support on that side, so as not to present anything that might interfere with the passage of a bird from the cage to the wheel. This wheel is supported with its spindle C within suitably-constructed bearings, and may, if desired, be made removable from the cage by passing the rear end of said spindle (which in that case I shall provide with a head, C‴) through an opening represented as broken out at H into an opening, L, Fig. 2, and making the front support removable by fitting it into a socket, G′.

J J are a series of perches, arranged far enough from the periphery or rim of the wheel to leave ample room for the bird to pass.

It will be observed that by placing the wheel on the outside of the cage-body I can discard the usual filling-wires on that side of the cage where the wheel is affixed, and thereby not only save considerable in the expense of getting up the said body, but also produce a large and unobstructed opening for the passage of the bird from the cage to the wheel. So by constructing the wheel as described—that is to say, supporting the rim of said wheel on one side only—I save the usual supports on the opposite side, and present no obstruction to the passage of the bird, as before mentioned.

The operation of the invention is simple and easily understood.

Having thus fully described my invention, I claim as new and desire to secure by Letters Patent of the United States—

1. A bird-cage in which one side is formed and closed by a revolving wheel, substantially as and for the object specified.

2. In a bird-cage, a wheel having its rim supported on one side only, as and for the object stated.

3. A bird-cage in which one side is formed and closed by a wheel having its rim supported on one side only, as and for the purpose specified.

4. The combination, with the revolving cage-wheel B, of a series of perches, J, as described, for the object specified.

5. The combination, with the body of a cage having the wheel B on its exterior, of the series of perches J, as and for the object stated.

6. In a bird-cage, a body having its fourth side formed and closed by a cage-wheel the rim of which is supported on one side only, said wheel being provided with a series of perches, as and for the purpose specified.

7. The wheel B, provided with the rod D, having head C‴, in combination with the opening L and standard G, as and for the object specified.

In testimony whereof I have hereunto set my hand in the presence of two subscribing witnesses.

ANSON E. MOOK.

Attest:

MICHAEL J. STARK,
JNO. STARK.